United States Patent Office 3,408,323
Patented Oct. 29, 1968

3,408,323
INSECT RESISTANT THERMOPLASTIC COMPOSITIONS
Ronald J. Hackney, Croydon Park, New South Wales, Australia, assignor to Union Carbide Australia Limited, a corporation of Australia
No Drawing. Filed May 13, 1965, Ser. No. 455,583
Claims priority, application Australia, May 13, 1964, 44,472/64
6 Claims. (Cl. 260—45.85)

ABSTRACT OF THE DISCLOSURE

An insect resistant polymer composition comprising a polyethylene, polypropylene or poly(vinyl chloride) base, a N-substituted carbamate insecticide and an acidic stabilizer for the insecticide.

---

This invention relates to improved thermoplastic compositions. More particularly, this invention provides improved thermoplastic compositions exhibiting increased resistance to attack by insects.

Synthetic thermoplastic resins are now being employed in fields which have heretofore been mainly limited to metallic materials, for example, damp courses and flashing in the building trades, water pipes, and sheathing for electric and telephone cables. Where such uses involve employing the thermoplastic resin within, or in close proximity to the ground, attack by insects especially termites often ensues and has thus limited the wide acceptance of thermoplastics in these fields.

Many problems exist in effectively incorporating an insecticide in thermoplastic resins. Firstly, the insecticide must be of a type which is effective against particularly troublesome insects, such as Coptotermes termites, when incorporated in and thus diluted by the thermoplastic resin. Secondly, the insecticide must not pose inordinate toxic problems by virtue of its vapor pressure when the thermoplastic resin containing said insecticide is being fabricated, as for example by extrusion or calendering. Thirdly, the insecicide-laden composition must be sufficiently thermally stable to withstand normal residence time in plastics fabricating equipment such as pipe extruders or film-blowing machines without thermally decomposing the insecticide.

The present invention provides an improved thermoplastic resin composition exhibiting increased resistance to insect attack which is comprised of a thermoplastic resin selected from the group consisting of polyethylene, naphthyl)-N-methyl carbamate, 1-(5,6-dihydronaphthyl)-rated therein:

(a) an effective amount of a N-substituted carbamate insecticide represented by the formula

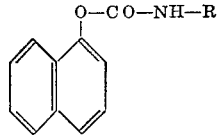

wherein R is a lower alkyl group; and
(b) a stabilizing quantity of an acidic stabilizer which is substantially non-volatile and non-corrosive within the temperature range of from about 130° C. to 200° C. for a period up to about 15 minutes.

Exemplary of the N-substituted carbamate insecticides applicable to the present invention are those disclosed in U.S. Patent 2,903,478 to Joseph A. Lambrech, which is incorporated herein by reference. Preferred among such insecticides for the purposes of the present invetion are 1-naphthyl-N-methyl carbamate (carbaryl), 1-(4-chloronaphthyl)-N-methyl carbamate, 1-(5,6-dihydronaphthyl)-N-methyl carbamate, 1-(5,8-dihydronaphthyl)-N-methyl carbamate and 1-naphthyl N-hexyl carbamate. Preferably, the insecticide is present in the thermoplastic composition in amounts of from about 0.05 to 3 percent by weight (calculated on the resin).

Exemplary of the acidic stabilizers found applicable to the present invention are such materials as boric acid, phosphoric acid, alkali metal dihydrogen phosphates, aryl sulfonic acids such as toluene sulfonic acid, oxalic acid, citric acid, acid salts of dibasic organic acids, acid treated clays and acid forms of synthetic zeolites. Preferably, the stabilizer is present in the thermoplastic composition in amounts of from about 0.05 to 5 percent by weight (calculated on the insecticide). In instances where the acid stabilizer does not readily flux with the molten resin and insecticide, it has been found helpful to finely grind the stabilizer to ensure adequate dispersion within the thermoplastic composition.

The following examples are for illustrative purposes only and are not to be construed as imposing limitations on the scope of the present invention.

EXAMPLE 1

A laboratory roll mill consisting of contra-rotating rolls (one of which was steam heated) was used to flux the thermoplastic material at a temperature of 122° C. The insecticide which had been pre-mixed with the powdered stabilizer was introduced into the flux and then mixed with thermoplastic resin. After approximately three minutes of milling, this mixture was stripped from the rolls in the form of a crepe and allowed to cool. The crepe was then cut into small pieces and introduced into a square "picture frame" mould and moulded in a compression press with heat being introduced through the platens of the press. The moulding was then cooled by cooling these platens and the moulding then removed. Mouldings produced in this way were then cut into strips to enable termite resistance tests to be carried out.

EXAMPLE 2

Thermoplastic pipe was produced from pellets of thermoplastic material which had been dry tumbled with the insecticide and stabilizer powders. This dry tumbling action resulted in a coating of each pellet with the two additive materials. These coated pellets were introduced into the hopper of a thermoplastic extrusion machine and extruded in the normal fashion, the die and cooling apparatus being employed to produce a pipe or tube continuously.

EXAMPLE 3

During the manufacture of polyethylene extrusion compounds, the polyethylene resin was fluxed and mixed in a Banbury mixer and additives were introduced into this flux and mixing material. At this stage were introduced insecticides and stabilizers pre-mixed and packaged in a polyethylene bag. After this mixing procedure the mixture was then introduced into the pelletising machine which produced pellets in a form useful for subsequent extrusion of moulding processes.

EXAMPLE 4

A series of test samples was prepared using 1% carbaryl (1-naphthyl-N-methyl carbamate) and a polyethylene pigmented with carbon black, within which was incorporated 1% of boric acid (based on carbaryl).

When moulded as in Example 1, the test strips retained 90% of the original carbaryl content. When pipe was prepared as in Example 2, 89% of the original carbaryl content was preserved at 300° F. and 82% at 400° F. When pellets were prepared as in Example 3, 90% of the original carbaryl content was retained in the pellets, and the polyethylene product produced by subsequent extrusion of the pellets retained 80% of the original carbaryl content.

By way of contrast, when polyethylene pigmented with carbon black had 1% of carbaryl incorporated therein without addition of the boric acid, only 60% of the original carbaryl content remained after processing into test strips as in Example 1.

The improved thermoplastic compositions of the present invention are extremely useful as cable sheathing and as pipe which are primarily for underground or surface use. It has been found that the compositions of the present invention afford excellent protection against insect attack, especially termite attack, whereas conventional cable coatings or even coatings with other insecticides have failed. This is mainly attributed to the difficulties which have heretofore existed in preparing a thermoplastic composition containing an effective amount of insecticide and which could undergo conventional thermoplastic processing without severe loss of the insecticide and without the normal thermal degradation associated with insecticides.

Although not wishing to be bound by a theory or mechanism, it is believed that the insecticide incorporated in the thermoplastic composition of the present invention exudes to the surface of the thermoplastic and impregnates a thin layer of the surrounding soil thus, in effect, providing a protective cloak about the pipe or cable which substantially deters insect attack.

What is claimed is:

1. An improved thermoplastic resin composition exhibiting increased resistance to insect attack comprised of a thermoplastic resin selected from the group consisting of polyethylene, polypropylene and poly(vinyl chloride) having incorporated therein:
   (a) an effective amount of a N-substituted carbamate insecticide represented by the formula:

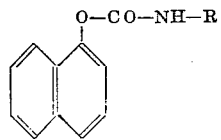

wherein R is a lower alkyl group; and
   (b) a stabilizing quantity of an acidic stabilizer for said insecticide which is substantially non-volatile and non-corrosive within the temperature range of from about 130° C. to 200° C. for a period up to about 15 minutes.

2. An improved thermoplastic resin composition as defined in claim 1 wherein the N-substituted carbamate insecticide is present in amounts of from about 0.05 to 3 percent by weight calculated on the resin.

3. An improved thermoplastic resin composition as defined in claim 1 wherein the acidic stabilizer is present in amounts of from about 0.05 to 5 percent by weight calculated on the insecticide.

4. An improved thermoplastic resin composition exhibiting increased resistance to termite attack comprises of a thermoplastic resin selected from the group consisting of polyethylene, polypropylene, and poly(vinyl chloride) having incorporated therein:
   (a) about 0.05 to 3 percent by weight calculated on the resin of a N-substituted carbamate insecticide represented by the formula:

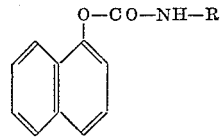

wherein R is a lower alkyl group; and
   (b) about 0.05 to 5 percent by weight calculated on the insecticide of an acidic stabilizer for said insecticide which is substantially non-volatile and non-corrosive with the temperature range of from about 130° C. to 200° C. for a period up to about 15 minutes.

5. An improved thermoplastic resin composition as defined in claim 4 wherein the insecticide is 1-naphthyl N-methyl carbamate.

6. An improved thermoplastic resin composition as defined in claim 4 wherein the insecticide is 1-naphthyl N-hexyl carbamate.

References Cited

UNITED STATES PATENTS

| | | | |
|---|---|---|---|
| 2,903,478 | 9/1959 | Lambreck | 167—30 |
| 3,154,518 | 10/1964 | Gradstem et al. | 260—45.9 |
| 3,203,853 | 8/1965 | Jager et al. | 167—30 |
| 3,235,532 | 2/1966 | Hopper et al. | 260—45.85 |
| 3,303,211 | 2/1967 | Peterson et al. | 260—45.85 |

DONALD E. CZAJA, *Primary Examiner.*

H. E. TAYLOR, *Examiner.*